US009824651B2

(12) United States Patent
Umekida et al.

(10) Patent No.: US 9,824,651 B2
(45) Date of Patent: Nov. 21, 2017

(54) DISPLAY DEVICE AND ELECTRONIC DEVICE

(71) Applicant: Sharp Kabushiki Kaisha, Osaka-shi, Osaka (JP)

(72) Inventors: Tetsuya Umekida, Osaka (JP); Kenji Maeda, Osaka (JP); Tatsuo Watanabe, Osaka (JP); Masayuki Natsumi, Osaka (JP); Yuichi Sato, Osaka (JP); Kazuya Takayama, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 14/443,446

(22) PCT Filed: Nov. 14, 2013

(86) PCT No.: PCT/JP2013/080782
§ 371 (c)(1),
(2) Date: May 18, 2015

(87) PCT Pub. No.: WO2014/080828
PCT Pub. Date: May 30, 2014

(65) Prior Publication Data
US 2015/0310814 A1    Oct. 29, 2015

(30) Foreign Application Priority Data
Nov. 22, 2012  (JP) .................................. 2012-256831

(51) Int. Cl.
*G09G 3/36*    (2006.01)
*G09G 5/00*    (2006.01)
(Continued)

(52) U.S. Cl.
CPC ......... *G09G 3/3611* (2013.01); *G09G 3/3607* (2013.01); *G09G 3/3614* (2013.01);
(Continued)

(58) Field of Classification Search
CPC .. G06F 2203/0384; G06F 3/0346; G06F 3/01; G06F 3/038; G06F 2203/0381;
(Continued)

(56) References Cited

U.S. PATENT DOCUMENTS

2005/0146608 A1* 7/2005 Yosida ............... H04N 1/00307
348/207.1
2006/0055794 A1   3/2006 Sato et al.
(Continued)

FOREIGN PATENT DOCUMENTS

JP    11-242463 A    9/1999
JP    2001-022335 A    1/2001
(Continued)

OTHER PUBLICATIONS

Official Communication issued in International Patent Application No. PCT/JP2013/080782, dated Feb. 10, 2014.
(Continued)

*Primary Examiner* — Gerald Johnson
(74) *Attorney, Agent, or Firm* — Keating & Bennett, LLP

(57) ABSTRACT

A display device disclosed includes a liquid crystal panel (6), and an image optimization circuit (4) for switching, in accordance with an update frequency of image data, between (i) a first mode in which a liquid crystal driver (7) is driven at a first driving frequency and (ii) a second mode in which the liquid crystal driver (7) is driven at a second driving frequency lower than the first driving frequency. The display device can therefore be used even in a case where a transmission path for image data is limited and optimally display high-resolution image data with reduced electric power consumption.

12 Claims, 6 Drawing Sheets

(51) Int. Cl.
*H04N 21/426* (2011.01)
*H04N 21/4402* (2011.01)
*H04N 21/443* (2011.01)

(52) U.S. Cl.
CPC ........... *G09G 3/3696* (2013.01); *G09G 5/006* (2013.01); *H04N 21/42653* (2013.01); *H04N 21/4402* (2013.01); *H04N 21/4436* (2013.01); *G09G 2310/0224* (2013.01); *G09G 2310/0229* (2013.01); *G09G 2320/0673* (2013.01); *G09G 2320/103* (2013.01); *G09G 2330/021* (2013.01); *G09G 2340/02* (2013.01); *G09G 2340/0414* (2013.01); *G09G 2340/0421* (2013.01); *G09G 2340/0435* (2013.01); *G09G 2350/00* (2013.01); *G09G 2370/04* (2013.01)

(58) Field of Classification Search
CPC ......... G06F 2203/04103; G06F 3/0354; G06F 3/0383; G06F 3/041; G06F 3/044; H04N 19/146; H04N 19/46; H04N 19/463
See application file for complete search history.

(56) References Cited

U.S. PATENT DOCUMENTS

| | | |
|---|---|---|
| 2008/0106542 A1 | 5/2008 | Park et al. |
| 2009/0122207 A1 | 5/2009 | Inoue et al. |
| 2009/0185082 A1 | 7/2009 | Hashimoto |
| 2010/0026790 A1 | 2/2010 | Ohba et al. |
| 2010/0066906 A1 | 3/2010 | Nakajima |
| 2011/0145879 A1 | 6/2011 | Rajamani et al. |
| 2011/0148826 A1 | 6/2011 | Koyama et al. |
| 2011/0175894 A1 | 7/2011 | Wakimoto et al. |
| 2011/0175895 A1 | 7/2011 | Hayakawa et al. |
| 2011/0234561 A1 | 9/2011 | Tzeng et al. |
| 2014/0035897 A1* | 2/2014 | Lee ..................... G09G 3/3696 345/212 |

FOREIGN PATENT DOCUMENTS

| | | |
|---|---|---|
| JP | 2003-037823 A | 2/2003 |
| JP | 2008-097005 A | 4/2008 |
| JP | 2009-044438 A | 2/2009 |
| JP | 2009-089209 A | 4/2009 |
| JP | 2009-229961 A | 10/2009 |
| JP | 2011-043827 A | 3/2011 |
| JP | 2011-145666 A | 7/2011 |
| JP | 2011-170331 A | 9/2011 |
| JP | 2012-18271 A | 1/2012 |
| JP | 2013-218002 A | 10/2013 |
| KR | 10-2005-0004836 A | 1/2005 |
| KR | 10-2008-0040281 A | 5/2008 |
| KR | 10-2012-0115521 A | 10/2012 |

OTHER PUBLICATIONS

Official Communication issued in corresponding European Patent Application No. 13857131.0, dated Oct. 28, 2015.
Jack, "Video Demystified: A Handbook for the Digital Engineer, Chapter 7. Digital Video Processing: Video Scaling", LLH Technology Publishing, ISBN: 978-1-878707-56-7, Jan. 1, 2001, 6 pages.

* cited by examiner (a) FIRST FRAME

| + | − | + | − | + | − | + |
|---|---|---|---|---|---|---|
| + | − | + | − | + | − | + |
| + | − | + | − | + | − | + |
| + | − | + | − | + | − | + |

(b) FIRST FRAME

| + | − | + | − | + | − | + |
|---|---|---|---|---|---|---|
| − | + | − | + | − | + | − |
| + | − | + | − | + | − | + |
| − | + | − | + | − | + | − |

SECOND FRAME

| − | + | − | + | − | + | − |
|---|---|---|---|---|---|---|
| − | + | − | + | − | + | − |
| − | + | − | + | − | + | − |
| − | + | − | + | − | + | − |

SECOND FRAME

| − | + | − | + | − | + | − |
|---|---|---|---|---|---|---|
| + | − | + | − | + | − | + |
| − | + | − | + | − | + | − |
| + | − | + | − | + | − | + |

DISPLAY DEVICE AND ELECTRONIC DEVICE

TECHNICAL FIELD

The present invention relates to a display device and an electronic device each of which can display a high-resolution image with reduced electric power consumption.

BACKGROUND ART

In recent years, in the field of mobile terminals including a mobile phone and a tablet PC, there has been a problem of electric power consumption increasing due to, for example, an improvement in operating frequency of a CPU. Further, the mainstream of displays (liquid crystal display devices) mounted on such mobile terminals has been those having a resolution equal to or higher than high definition (HD). Electric power consumed by a mobile terminal in displaying an image is thus expected to increase more and more in the future.

Under such circumstances, attention has been drawn to a display technique that allows a high-resolution image to be displayed with reduced electric power consumption.

Electric power consumption of a liquid crystal display device basically depends on a driving frequency of that liquid crystal display device. Thus, as is publicly known, the electric power consumption can be effectively reduced in a case where the driving frequency is set at a low value.

In the field of display devices, liquid crystal display devices are most common. The mainstream of liquid crystal display devices has been those including, as switching elements for driving a liquid crystal panel, thin film transistors (TFTs) each including a semiconductor layer made of continuous grain silicon (CGS) or amorphous silicon (a-Si).

Such a liquid crystal display device is typically driven at 60 Hz. In a case where the liquid crystal display device is driven at a driving frequency of less than 60 Hz so as to reduce its electric power consumption, the liquid crystal display device carries out a refresh operation less often, and the TFTs have a longer off-period accordingly. The liquid crystal display device thus needs to keep respective voltages of pixel electrodes substantially constant over a longer period.

A TFT including such a semiconductor layer made of CGS or a-Si has a relatively large amount of a current leaking while the TFT is off. Thus, it is impossible to keep the voltage of a pixel electrode substantially constant for longer than a predetermined period while the TFT is off, with the result of a decrease in the voltage of the pixel electrode.

Thus, in a case where a liquid crystal display device includes TFTs each (i) including a semiconductor layer made of CGS or a-Si and (ii) having an off-period longer than a predetermined period, the liquid crystal display device suffers from a decrease in luminance and/or an increase in flicker occurrence, with the result of deterioration in display quality.

In contrast, attention has been drawn in recent years to a TFT including, as a semiconductor layer, an oxide layer containing at least one element selected from indium (In), gallium (Ga), and zinc (Zn), e.g., a TFT including an oxide semiconductor layer containing InGaZnOx. Such a TFT has a significantly small amount of a current leaking while the TFT is off, as compared with the above-described TFT including a semiconductor layer made of CGS or a-Si. TFTs each including such an oxide semiconductor layer do not easily let electric charge leak from pixels while the TFTs are off. A liquid crystal display device including such TFTs thus do not have deterioration in display quality even in a case where the liquid crystal display device is driven at a driving frequency of less than 60 Hz.

As described above, a liquid crystal panel (hereinafter, referred to as "oxide semiconductor liquid crystal panel") that includes TFTs each including an oxide semiconductor layer can be driven at a decreased driving frequency. This makes it possible to reduce electric power consumption as compared with a liquid crystal panel that includes TFTs each including a semiconductor layer made of CGS or a-Si.

A TFT including an oxide semiconductor layer, which is included in the oxide semiconductor liquid crystal panel described above, is also higher in electron mobility while the TFT is on than a TFT including a semiconductor layer made of CGS or a-Si. This allows the oxide semiconductor liquid crystal panel to include small TFTs for respective pixels and to have an increased aperture rate and an increased light transmittance.

With use of these liquid crystal panel characteristics, it is possible to reduce electric power consumed by a backlight, thereby making it possible to (i) reduce electric power consumption of the liquid crystal display device while maintaining a luminance equal to that of a conventional liquid crystal display device or to (ii) prepare, without causing a decrease in luminance, a liquid crystal panel having resolution higher than that of a conventional liquid crystal panel.

For the above reasons, in the field of displays (liquid crystal display devices) in which reduced electric power consumption is demanded, importance is expected to be further placed on the oxide semiconductor liquid crystal panel in the future.

There have also been many devised methods for transmitting high-resolution image data via a transmission path.

For example, in order to increase a maximum transmission capacity per unit time for image data, an additional transmission path is provided so as to enlarge a surface area of the transmission path, and/or a data transmission frequency is increased.

In a case where the surface area of a transmission path has been enlarged as described above, more image data can be transmitted in a single transmission process. In a case where the data transmission frequency has been increased, image data can be transmitted in an increased amount per unit time.

However, these methods each unfortunately require a mobile terminal or the like to have a larger frame size and/or larger electric power consumption.

Patent Literatures 1 through 3 each disclose a method for high-speed transmission of image data. However, these methods may increase electric power consumption and/or a mounting area.

CITATION LIST

Patent Literature 1

Japanese Patent Application Publication Tokukai No. 2009-89209 (Publication Date: Apr. 23, 2009)
Patent Literature 2
Japanese Patent Application Publication Tokukai No. 2008-97005 (Publication Date: Apr. 24, 2008)

Japanese Patent Application Publication Tokukaihei No. 11-242463 (1999) (Publication Data: Sep. 7, 1999)

SUMMARY OF INVENTION

Technical Problem

Under the circumstances, there has been proposed a driving method for displaying, with use of a display panel, an image while switching its driving frequency in accordance with whether an image to be displayed is a motion image or a still image. For example, there has been proposed a driving method for displaying, with use of an oxide semiconductor liquid crystal panel, an image while switching between normal driving (60 Hz) and pause driving (1 Hz) in accordance with whether an image to be displayed is a motion image or a still image.

This driving method can be easily used in a case where a transmission path for image data is not limited, i.e., in a case where full-sized image data can be transmitted via an image data transmission path within one frame period, for example, in a case where (i) image data is relatively small in size and/or (ii) a surface area of the transmission path for image data is relatively large. However, the driving method cannot be easily used in a case where a size of the image data exceeds a size that can be transmitted via the transmission path within one frame period.

The present invention has been attained in view of the above problems. An object of the present invention is to provide a display device and an electronic device each of which can be used even in a case where a transmission path for image data is limited and each of which can optimally display high-resolution image data with reduced electric power consumption.

Solution to Problem

In order to attain the above object, a display device of the present invention is a display device including: a display panel including a plurality of active elements; a driving circuit for driving scanning signal lines and data signal lines both of which are included in the display panel; and an image processing circuit section for supplying image data and a control signal to the driving circuit, the image processing circuit section including: an image optimization circuit for switching, in accordance with an update frequency of the image data, between (i) a first mode in which the driving circuit is driven at a first driving frequency and (ii) a second mode in which the driving circuit is driven at a second driving frequency lower than the first driving frequency, in a case where the driving circuit is driven in the first mode, the image optimization circuit, in a case where the image data to be transmitted via a transmission path provided between the image processing circuit section and the driving circuit has a data amount that exceeds a maximum transmission capacity for one frame period, carrying out first image data processing for reducing the data amount of the image data so that the image data is transmitted via the transmission path within the one frame period while the driving circuit is driven in the first mode, and the driving circuit, in accordance with an image restoration control signal transmitted from the image optimization circuit, carrying out second image processing for restoring, for display, the image data that has been subjected to the first image data processing, in a case where the driving circuit is driven in the second mode, the image optimization circuit transmitting a control signal for causing the driving circuit to be driven at the second driving frequency so that the image data is transmitted via the transmission path within one frame period while the driving circuit is driven in the second driving mode.

Advantageous Effects of Invention

As described above, the display device of the present invention is arranged such that the image processing circuit section including: an image optimization circuit for switching, in accordance with an update frequency of the image data, between (i) a first mode in which the driving circuit is driven at a first driving frequency and (ii) a second mode in which the driving circuit is driven at a second driving frequency lower than the first driving frequency, in a case where the driving circuit is driven in the first mode, the image optimization circuit, in a case where the image data to be transmitted via a transmission path provided between the image processing circuit section and the driving circuit has a data amount that exceeds a maximum transmission capacity for one frame period, carrying out first image data processing for reducing the data amount of the image data so that the image data is transmitted via the transmission path within the one frame period while the driving circuit is driven in the first mode, and the driving circuit, in accordance with an image restoration control signal transmitted from the image optimization circuit, carrying out second image processing for restoring, for display, the image data that has been subjected to the first image data processing, in a case where the driving circuit is driven in the second mode, the image optimization circuit transmitting a control signal for causing the driving circuit to be driven at the second driving frequency so that the image data is transmitted via the transmission path within one frame period while the driving circuit is driven in the second driving mode.

Therefore, it is possible to provide a display device and an electronic device each of which can be used even in a case where a transmission path for image data is limited and each of which can optimally display high-resolution image data with reduced electric power consumption.

DESCRIPTION OF EMBODIMENTS

The following will discuss embodiments of the present invention in detail with reference to the drawings. Note that the respective sizes, materials, shapes, relative positions, etc. of constituents described for the embodiments are merely examples, and that the scope of the present invention should not be narrowly interpreted within the limits of such embodiments.

Each of the following embodiments is a liquid crystal display device. However, the present invention is applicable not only to a liquid crystal display device but also to other flat display devices such as an electroluminescent (EL) display device. Further, the present invention is also applicable to various electronic apparatuses that include such display devices.

Embodiment 1

The following discusses a liquid crystal display device 1 as an embodiment of the present invention with reference to FIGS. 1, 2, 3, and 7.

Figure 1:
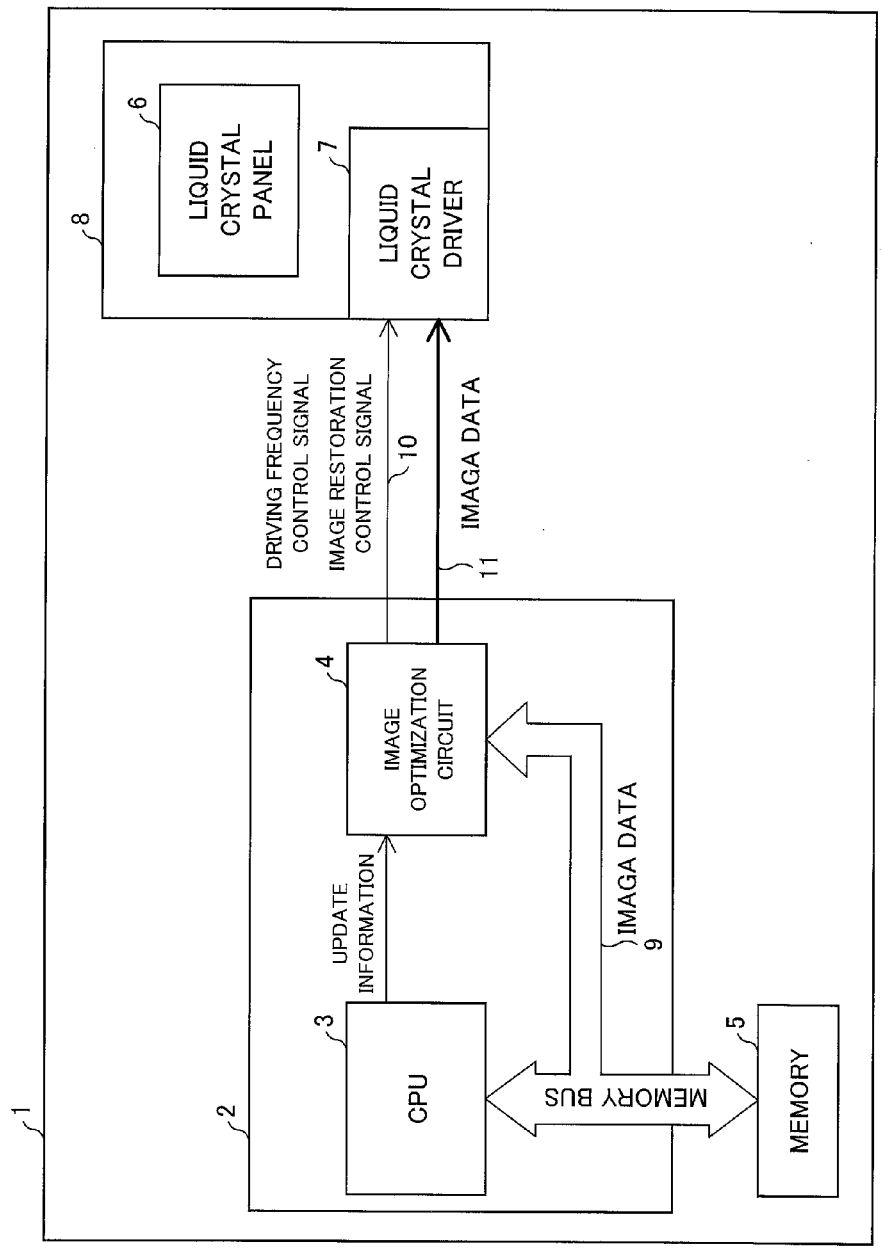
FIG. 1 is a diagram schematically illustrating a system configuration of a liquid crystal display device of one embodiment of the present invention.

FIG. 1 is a diagram schematically illustrating a system configuration of the liquid crystal display device 1.

As illustrated in FIG. 1, the liquid crystal display device 1 includes (i) a host 2 including a CPU 3 and an image optimization circuit 4, (ii) a memory 5, and (iii) a liquid crystal module section 8 including a liquid crystal panel 6 and a liquid crystal driver 7.

The present embodiment is arranged such that the liquid crystal panel 6 is a liquid crystal panel including a substrate having TFTs each including, as a semiconductor layer, an oxide layer containing at least one element selected from In, Ga, and Zn, for example, an oxide semiconductor layer made of InGaZnOx. However, the liquid crystal panel 6 is not limited to such a liquid crystal panel and can be, for example, a liquid crystal panel including a substrate having TFTs each including a semiconductor layer made of CGS, a-Si, or the like.

As described above, the liquid crystal panel 6, which includes a substrate having TFTs each including an oxide semiconductor layer, has only a small amount of a current leaking while the TFTs are off, and can thus display a high-quality image even in a case where a rewrite cycle is longer (that is, a driving frequency is lower). Therefore, with use of an oxide semiconductor liquid crystal panel, the driving frequency can be variable.

The liquid crystal display device 1 can include a liquid crystal panel including a substrate having TFTs each including a semiconductor layer made of CGS or a-Si. Even in such a case, although the rewrite cycle can be set longer by a different degree without deterioration in display quality, the driving frequency can be variable similarly.

The CPU 3 supplies image data to the image optimization circuit 4 and to the memory 5 via a memory bus 9 (see FIG. 1).

Then, the image optimization circuit 4 optimizes, on the basis of update information (indicative of an update frequency) of the image data, which information is supplied from the CPU 3, (i) a driving frequency of the liquid crystal driver 7 and (ii) a size of image data to be transmitted to the liquid crystal driver 7 via an image data transmission path 11.

Further, the image optimization circuit 4 is arranged to transmit, to the liquid crystal driver 7 via a control signal transmission path 10, (i) a driving frequency control signal for controlling the driving frequency of the liquid crystal driver 7 and (ii) an image restoration control signal and to transmit the image data having the optimized size to the liquid crystal driver 7 via the image data transmission path 11.

The image restoration control signal is a control signal for, (i) in a case where the image optimization circuit 4 has, for example, compressed image data, causing the liquid crystal driver 7 to restore the compressed image data and display the restored image data and (ii) in a case where the image optimization circuit 4 has not compressed image data, causing the liquid crystal driver 7 to display the image data as transmitted.

The liquid crystal driver 7 carries out image processing with respect to the image data, transmitted from the image optimization circuit 4, in accordance with the image restoration control signal, and then drives the liquid crystal panel 6 at the optimized driving frequency so as to cause the liquid crystal panel 6 to display the image data on a display surface thereof.

That is, in order to provide a display device that can be used even in a case where an image data transmission path is limited and that can optimally display high-resolution image data with reduced electric power consumption, the liquid crystal display device 1 is arranged to (i) set a driving frequency for the liquid crystal panel and a size for image data in accordance with update information (update frequency) transmitted from the CPU 3, and then (ii) cause the liquid crystal panel 6 to display the image data on the display surface thereof.

Figure 2:
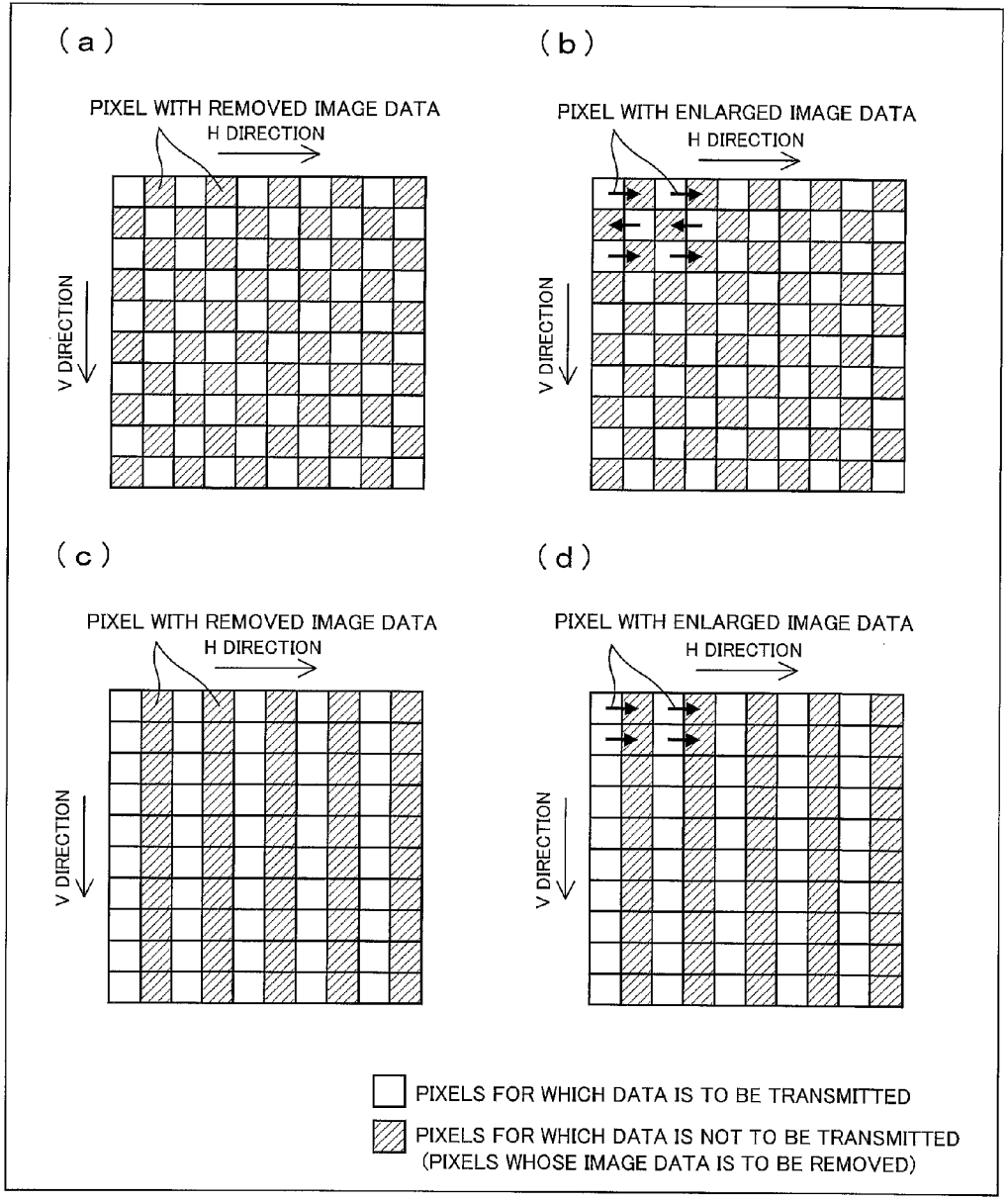
FIG. 2 shows diagrams illustrating (i) examples of image processing carried out by an image optimization circuit included in the liquid crystal display device of the embodiment of the present invention and (ii) examples of image processing carried out by a liquid crystal driver included in the liquid crystal display device.

FIG. 2 shows diagrams illustrating (i) examples of image compression processing carried out by the image optimization circuit 4 included in the liquid crystal display device 1 and (ii) examples of image restoration processing carried out by the liquid crystal driver 7 included in the liquid crystal display device 1.

The image optimization circuit 4 is arranged so as to set the driving frequency at 60 Hz upon receipt from the CPU 3 of update information indicative of an image update. In such a case, one frame has a relatively short period of 16.7 msec.

The liquid crystal display device 1 is used in a mobile terminal or the like, which has a restriction on its size. The image data transmission path 11 can thus have only a limited surface area.

Thus, it is difficult for the image data transmission path 11, which has a limited surface area, to transmit data on a higher resolution image within the one frame period without processing the image data.

In view of the above difficulty, the present embodiment is arranged such that the image optimization circuit 4 carries out, as the image compression processing, image processing for removing image data of every other pixel so as to reduce a data amount of image data.

(a) of FIG. 2 is a diagram illustrating an image processing method used in the image optimization circuit 4 and is a diagram for describing how pixel data of a pixel adjacent to another pixel in H and V directions in FIG. 2 is removed.

The image optimization circuit 4 is arranged to (i) remove, from high-resolution image data for one frame, pixel data of a pixel adjacent to another frame in the H and V directions as illustrated in (a) of FIG. 2 and (ii) transmit only image data of remaining pixels (indicated in white in FIG. 2) to the liquid crystal driver 7 via the image data transmission path 11. This makes it possible to halve the data amount of image data transmitted via the image data transmission path 11.

With this image processing method, the image optimization circuit 4 can transmit, within the one frame period, image data for one frame via the image data transmission path 11, which has a limited surface area.

(b) of FIG. 2 is a diagram illustrating the image restoration processing carried out by the liquid crystal driver 7 and is a diagram for describing how the liquid crystal driver 7 (i) restores the image data of the pixel, which image data has been removed as illustrated in (a) of FIG. 2, with direct use of the image data of the adjacent pixel and (ii) displays the restored image data.

As illustrated in (b) of FIG. 2, (i) on each odd-numbered row among rows arranged in the V direction, each pixel with removed image data directly uses, for display, image data of a pixel that is adjacent to the above pixel and that is to the left thereof, and (ii) on each even-numbered row among the rows arranged in the V direction, each pixel with removed image data directly uses, for display, image data of a pixel that is adjacent to the above pixel and that is to the right thereof.

Note that while (a) and (b) of FIG. 2 illustrate an example of the image processing carried out between the right and left pixels adjacent to each other, the image processing may alternatively be carried out between upper and lower pixels adjacent to each other.

(c) of FIG. 2 is a diagram illustrating an example of another image processing method that can be used in the image optimization circuit 4.

As illustrated in (c) of FIG. 2, with this image processing method, the image optimization circuit 4 removes image data from every other column among columns arranged in the H direction and thus halves the data amount of image data to be transmitted.

The driving frequency and the rate of reduction of image data which are used in a case where there is an image update in the present embodiment are merely examples. The driving frequency and reduction rate for the present invention are not limited thereto.

(d) of FIG. 2 is a diagram illustrating the image processing carried out by the liquid crystal driver 7 and is a diagram for describing how the liquid crystal driver 7 (i) restores the image data of the pixel, which image data has been removed as illustrated in (c) of FIG. 2, with direct use of the image data of the adjacent pixel and (ii) displays the restored image data.

As illustrated in (d) of FIG. 2, each pixel with removed image data directly uses, for display, image data of a pixel that is adjacent to the above pixel and that is to the left thereof.

Note that while (c) and (d) of FIG. 2 illustrate an example of the image processing carried out between the right and left pixels adjacent to each other, the image processing may alternatively be carried out between upper and lower pixels adjacent to each other.

In a case where the image optimization circuit 4 receives from the CPU 3 image data for one frame which image data has a data amount that can be transmitted via the image data transmission path 11 within one frame period, the image data optimization circuit 4 does not need to carry out image processing such as that illustrated in FIG. 2.

The image optimization circuit 4 is arranged to set the driving frequency at lower than 60 Hz upon receipt from the CPU 3 of update information indicative of no image update. In such a case, one frame period is longer.

The present embodiment is arranged such that in a case where there is no image update, the driving frequency is set at 30 Hz and is set to then decrease stepwise to 1 Hz after a predetermined period. However, the present invention is not limited to such an arrangement. The driving frequency and how to decrease the driving frequency are not specifically limited, provided that one frame period is long enough for image data for one frame to be transmitted via the image data transmission path 11 within the one frame period.

As described above, in a case where there is no image update, the driving frequency is set at a low value, and one frame period is sufficiently long. In such a case, the image optimization circuit 4 does not carry out, with respect to the image data, image processing such as that illustrated in FIG. 2 and transmits the image data to the liquid crystal driver 7 via the image data transmission path 11 so that the image data is displayed without being processed.

In a case where there is no image update as described above, the image data is on a still image. The liquid crystal display device 1 can thus display the image data without carrying out the image processing even in a case where the image data is on a high-resolution image. The liquid crystal display device 1 can therefore display a high-resolution image. Further, a display device including TFTs each including an oxide semiconductor layer can use a low driving frequency while displaying a high-resolution image. Such a display device thus consumes even less electric power for display than a display device including TFTs each including a CGS or a-Si layer.

Figure 3:
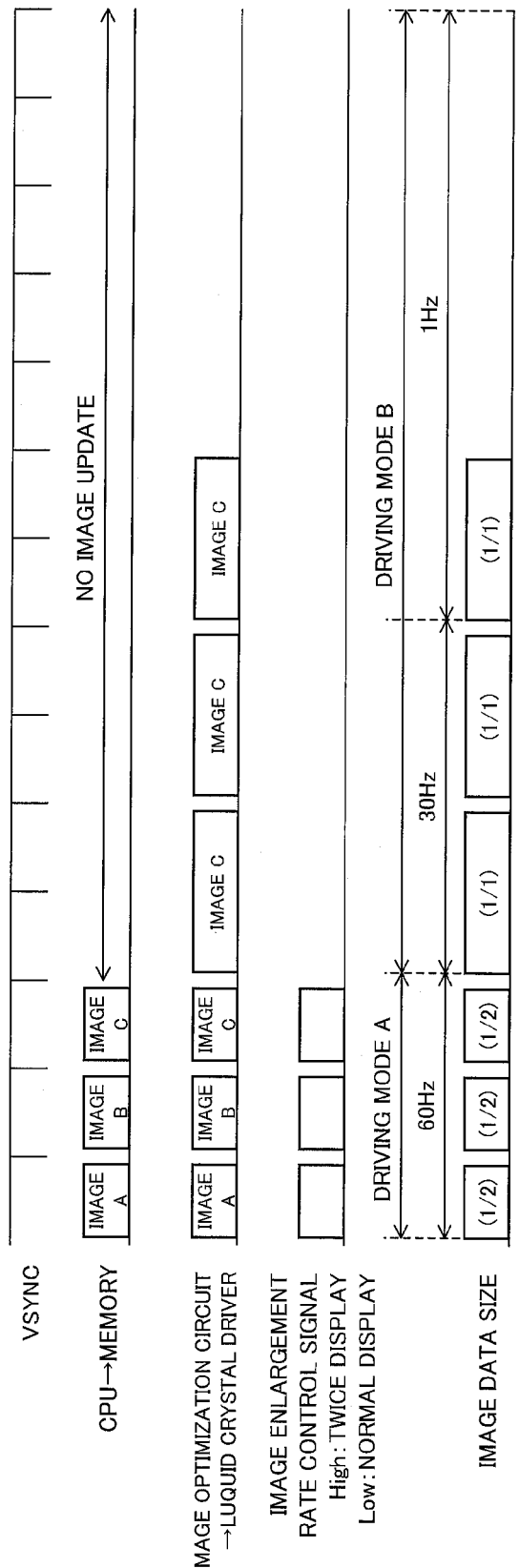
FIG. 3 is a diagram for describing an example operation of the liquid crystal display device of one embodiment of the present invention.

FIG. 3 is a diagram for describing an example operation of the liquid crystal display device 1.

<Driving Mode A: Motion Image Display Mode (Normal Mode)>

As illustrated in FIG. 3, image data indicative of images A, B, and C is sequentially supplied from the CPU 3 to the image optimization circuit 4 and to the memory 5.

The CPU 3 transmits update information of image data to the image optimization circuit 4. After the image data indicative of the image C is transmitted, there is no image update, so that the CPU 3 transmits, as the update information of the image data, data indicative of absence of an image update.

The present embodiment is arranged such that in a case where there is no image update, data indicative of the absence of an image update is transmitted as the update information of the image data. However, the present embodiment may alternatively be arranged such that update information is transmitted only in a case where there is an image update and is not transmitted in the case where there is no image update.

In a case where the image optimization circuit 4 has received from the CPU 3 data indicative of the presence of an image update as the update information of the image data, the image optimization circuit 4 transmits a driving frequency control signal to the liquid crystal driver 7 via the control signal transmission path 10 so as to drive the liquid crystal panel 6 at the driving frequency of 60 Hz.

Next, the image optimization circuit 4 (i) carries out, with use of the image processing method as illustrated in (a) of FIG. 2, image processing with respect to the image data indicative of the images A, B, and C so as to reduce the data amount of the image data to a half of that of the original image data and then (ii) transmits the image data to the liquid crystal driver 7 via the image data transmission path 11.

The image optimization circuit 4 transmits an image enlargement rate control signal (image restoration control signal) to the liquid crystal driver 7 via the control signal transmission path 10. The image enlargement rate control signal is, as illustrated in FIG. 3, at a high level when the image optimization circuit 4 transmits the image data indicative of the images A, B, and C to the liquid crystal driver 7. In response to the image enlargement rate control signal, the liquid crystal driver 7 (i) carries out, with use of the image processing method as illustrated in (b) of FIG. 2, image processing with respect to the image data transmitted and (ii) causes the liquid crystal panel 6 to display the image data on the display surface thereof.

Note that while the above description has dealt with a case where the liquid crystal panel 6 is driven at a driving frequency of 60 Hz, the driving frequency can be set as appropriate in accordance with a display environment, and a maximum driving frequency is preferably as high as possible.

In this driving mode, a display image is updated continuously. Thus, even in a case where image data is subjected to image processing with use of the image processing methods as illustrated in (a) and (b) of FIG. 2 and is then displayed, deterioration in image quality is only very small.

In other words, in a case where a display image is updated one after another, the image data is motion image data, and the displayed image changes continuously. Thus, even in a case where image data is subjected to image processing with use of the image processing methods as illustrated in (a) and (b) of FIG. 2 and is then displayed, display of the image data is not so deteriorated as to be obviously seen.

In a case where the liquid crystal driver 7 is mounted on the liquid crystal module 8, included in the liquid crystal display device 1, by a chip on glass (COG) method, a receiving circuit of the liquid crystal driver 7 needs to be as small as possible. In such a case, a maximum transmission capacity for one frame period between the image optimization circuit 4 and the liquid crystal driver 7 is a bottleneck, so a compression rate of the size of the image data simply needs to be determined in accordance with the maximum transmission capacity.

The description of the present embodiment has dealt only with an example case where the compression rate of the size of the image data is a rate at which the data amount of the original image data is halved. However, the compressibility modulus of the size of the image data is not limited to it and can be another rate (e.g., 2/3 or 3/4 of the original image data), provided that the image data for one frame can be transmitted to the liquid crystal driver 7 via the image data transmission path 11 within one frame period.

In a case where the maximum transmission capacity for one frame is equal to or greater than the size of the original image data, it is of course possible to transmit and display the original image data without compression. In such a case, since deterioration in image quality is only very small even in a case where the image data is subjected to image processing with use of the image processing methods as illustrated in (a) and (b) of FIG. 2 and is then displayed, it is also possible to carry out the image processing so that electric power consumption is reduced.

<Driving Mode B: Still Image Display Mode (Supplemental Mode)>

After the liquid crystal display device 1 is driven in the driving mode A described above, the CPU 3 transmits update information of image data to the image optimization circuit 4. After the image data indicative of the image C is transmitted, there is no image update, so that the CPU 3 transmits, as the update information of the image data, data indicative of absence of an image update.

In such a case, the image optimization circuit 4 transmits the driving frequency control signal to the liquid crystal driver 7 via the control signal transmission path 10 so as to drive the liquid crystal panel 6 at a driving frequency of 30 Hz for a predetermined period and then at a driving frequency of 1 Hz.

The present embodiment is arranged such that the driving frequency is decreased stepwise in such a manner that the liquid crystal panel 6 is driven at the driving frequency of 30 Hz for the predetermined period and then at the driving frequency of 1 Hz so that an abrupt switch of the driving frequency does not affect image quality. Note, however, that the driving frequency is not necessarily decreased stepwise.

In a case where the image optimization circuit 4 has received from the CPU 3 data indicative of the absence of an image update as the update information of the image data, the driving frequency is decreased to 30 Hz and then to 1 Hz so that one frame period is sufficiently long (see FIG. 3). Therefore, the image data is not subjected to image processing as illustrated in FIG. 2, but transmitted without being processed to the liquid crystal driver 7 via the image data transmission path 11 so that the image data is displayed.

The liquid crystal display device 1 is arranged to switch to (i) the driving mode A in a case where there is a new image update to be carried out after displaying an image in the driving mode B and back to (ii) the driving mode B at a timing at which the update information starts indicating no image update again. By switching between the driving modes A and B so as to control the display frequency and the size of the image data as described above, the liquid crystal display device 1 can display a high-resolution image with reduced electric power consumption.

Figure 7:
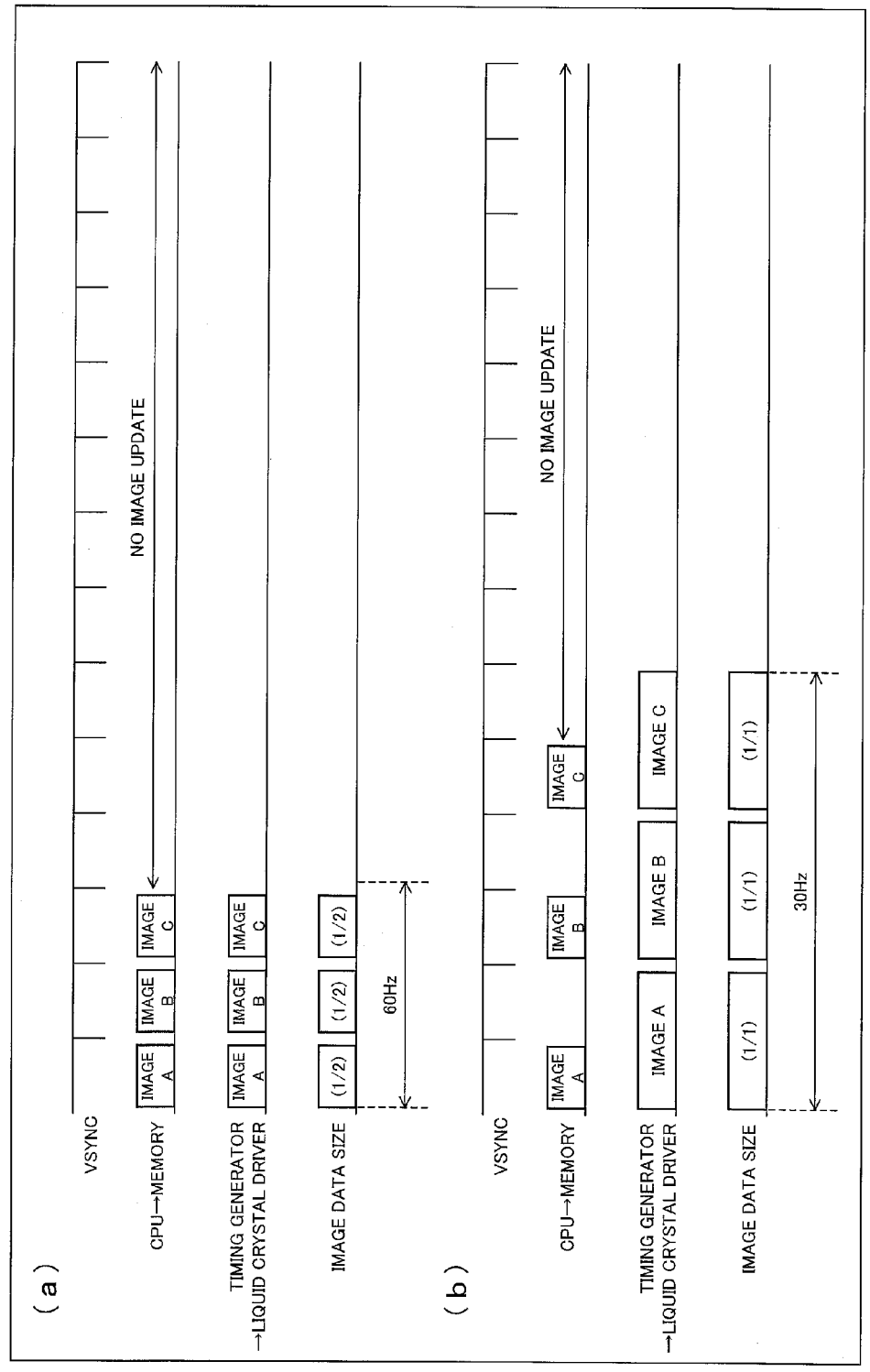
FIG. 7 shows diagrams for describing a problem that occurs in a case where a liquid crystal display device is driven in only one of the driving modes A and B.

FIG. 7 shows diagrams for describing a problem that occurs in a case where a liquid crystal display device is driven in only one of the driving modes A and B.

(a) of FIG. 7 is a diagram illustrating driving timings and image data size for a case where the liquid crystal display device is driven only in the driving mode A.

In (a) of FIG. 7, the liquid crystal display device is driven in such a manner that since image data to be transmitted from the CPU to the memory is on a high-resolution image, image data to be transmitted from the timing generator to the liquid crystal driver is subjected to data processing as illustrated in (a) of FIG. 2. The image data thus has a data amount half the data amount of image data transmitted from the CPU to the memory. The liquid crystal driver, as illustrated in (b) of FIG. 2, enlarges the image data having the half data amount and displays the enlarged image data.

While a display image changes from the image A to the image B and to the image C, the display image changes continuously, so that deterioration in display quality is not problematically large even in a case where the image data having the half data amount is enlarged and is displayed.

However, during the absence of an image update after the image C, the display image does not change continuously, so that deterioration in display quality is problematically significant in a case where the image data having the half data amount is enlarged and is displayed.

(b) of FIG. 7 is a diagram illustrating driving timings and image data size for a case where the liquid crystal display device is driven only in the driving mode B.

In (b) of FIG. 7, the liquid crystal display device is driven in such a manner that image data transmitted from the CPU to the memory and image data transmitted from the timing generator to the liquid crystal driver are high-resolution image data having an equal data amount.

With this method, the timing generator can transmit high-resolution image data to the liquid crystal driver because the liquid crystal panel is driven at the driving frequency of 30 Hz and one frame period is long as illustrated in (b) of FIG. 7 so that a transmittable period for image data for one frame is long.

This driving method makes it possible to prevent an increase in electric power consumption by an amount by which the driving frequency of the liquid crystal panel has been decreased. Further, the liquid crystal display device does not enlarge image data for display as illustrated in (a) of FIG. 7, but displays high-resolution image data without processing the image data. The deterioration in display quality thus does not occur even during the absence of an image update after the image C.

However, with this driving method, while a display image changes from the image A to the image B and to the image C (i.e., while a display image changes continuously), the liquid crystal display device problematically cannot smoothly display a motion image of quick movements or the like because the driving frequency is as low as 30 Hz.

<Countermeasure for Afterimage>

As one property of liquid crystal image display, a single drawing (write in) refresh (hereinafter, referred to as "refresh") may leave an afterimage of a previous image.

In a case where the CPU 3 continuously updates the image data, the liquid crystal display device 1 is driven in the driving mode A constantly, and the image data is updated continuously, so that no afterimage is seen. However, when the driving mode A is switched to the driving mode B, an afterimage may be seen if the refresh is carried out only once.

To avoid the above risk, the present embodiment is arranged to carry out the refresh a plurality of times so as to prevent an afterimage.

Specifically, the present embodiment, after displaying an image in the driving mode A (60 Hz, 1/2 size), carries out the refresh in the driving mode B (30 Hz and 1 Hz, 1/1 size) a plurality of times (see FIG. 3).

While the refresh is being carried out, the image optimization circuit 4 reads out the image data indicative of the image C from the frame memory 5 a plurality of times.

It is also possible to prevent an afterimage with use of a method other than that illustrated in FIG. 3.

For example, the present embodiment may alternatively be arranged to, even in a case where the image optimization circuit 4 has received from the CPU 3 data indicative of the absence of an image update after an image is displayed in the driving mode A (60 Hz, 1/2 size), (i) maintain the driving mode A for a predetermined period and then (ii) switch to the driving mode B (this method is not illustrated in the drawings).

During the predetermined period, i.e., during the afterimage prevention period, the refresh is carried out at 60 Hz and 1/2 size a plurality of times for the image data indicative of the image C.

In a case where an afterimage prevention period is provided at an end portion of a period of the driving mode A as described above, it is possible to carry out the refresh at a frequency of 60 Hz. This allows eliminating an afterimage quickly.

Note that with this method, at a time at which the driving mode A is switched to the driving mode B, image data for which the refresh is carried out a plurality of times in the driving mode A is different in size (resolution) from image data in the driving mode B, but the original image data for the former image data is identical to that for the latter image data. In the driving mode A, a removal of pixel data of the original image data is carried out and then the resulting image data is enlarged so as to be displayed. Therefore, a display device having high-resolution does not show a visible afterimage.

In a case where an afterimage is visible, the refresh simply needs to be carried out a plurality of times at a proper driving frequency and a proper size. For example, in a case where the maximum transmission capacity for one frame is approximately 1/5 of the size of the original image data in the driving mode A, the refresh may be carried out a plurality of times for afterimage prevention at 30 Hz and at a reduction rate of 2/5.

<Other Measures for Enhancing Display Quality>

The present embodiment is arranged such that at the time at which the driving mode A is switched to the driving mode B, the driving frequency is decreased stepwise from 60 Hz (1/2 size) to 30 Hz (1/1 size) and to 1 Hz (1/1 size) so that a switch of the driving frequency is not so obvious as to be seen. Note, however, that the present invention is not limited to such an arrangement. The driving frequency may alternatively be decreased stepwise, for example, from 60 Hz (1/2 size) to 30 Hz (1/1 size), to 15 Hz (1/1 size), and to 1 Hz (1/1).

Further, in a case where image data displayable at the driving frequency of 60 Hz has a size of equal to or less than 1/2, it is also possible to increase the size of the image data stepwise while the driving frequency is 30 Hz, 15 Hz, or 1 Hz.

For example, the size of image data can be increased from 60 Hz (1/4 size) to 30 Hz (1/2 size), to 15 Hz (1/1 size), and to 1 Hz (1/1 size). Increasing the size of image data stepwise as such can reduce roughness in a display image.

Furthermore, it is also possible to prevent deterioration in display quality by increasing, in switching from the driving mode A to the driving mode B, the size of image data stepwise which has been subjected to the image compression processing.

Embodiment 2

Figure 4:
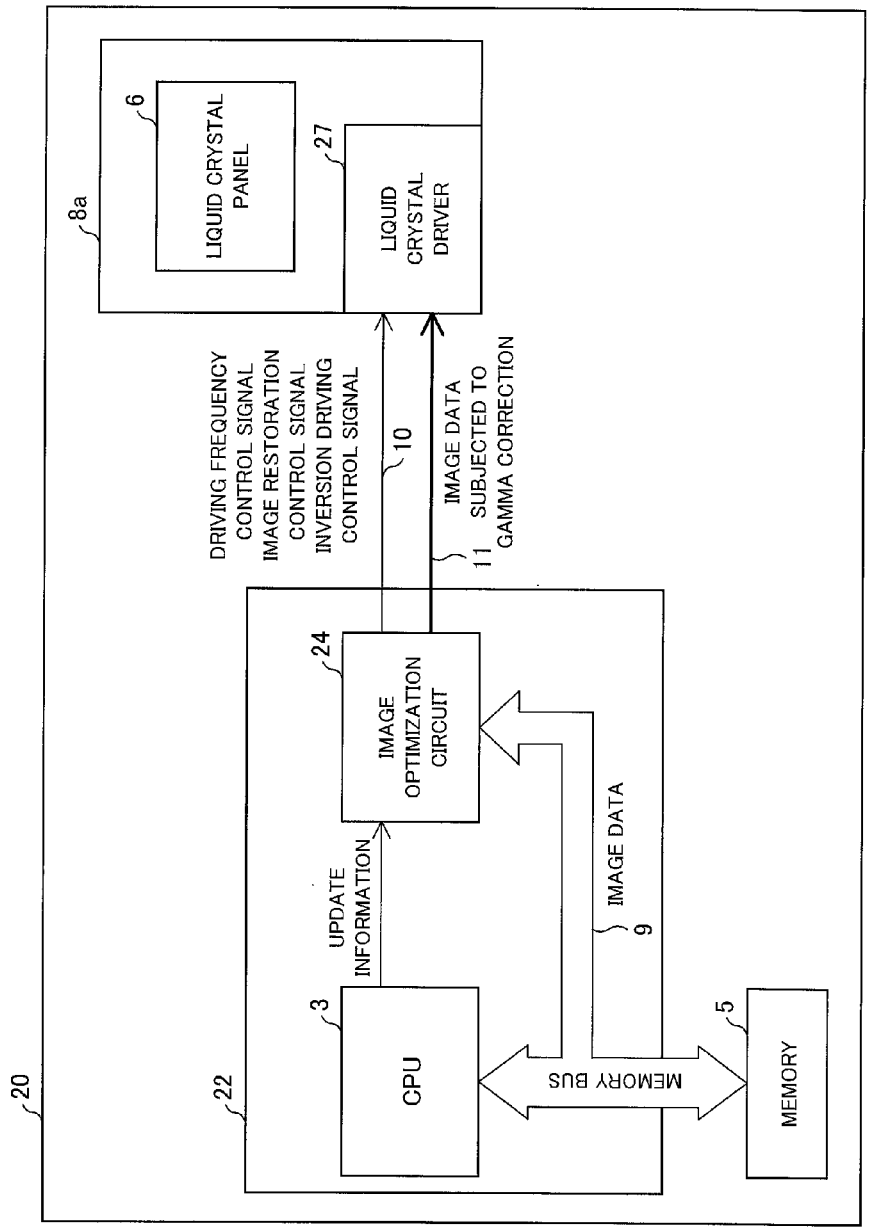
FIG. 4 is a diagram schematically illustrating a system configuration of a liquid crystal display device of a second embodiment of the present invention.
Figures 5, 6:
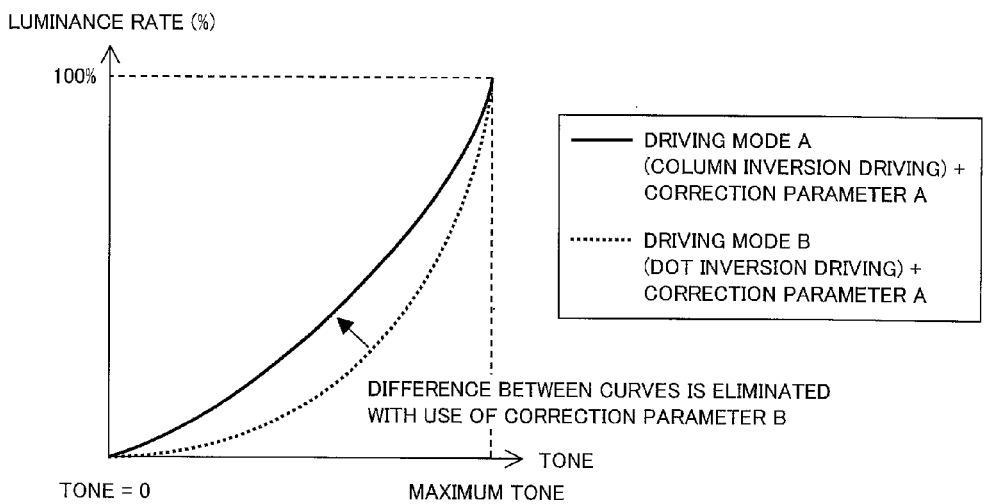
FIG. 5 shows diagrams for describing a polarity inversion driving method used in the liquid crystal display device of the second embodiment of the present invention.
FIG. 6 is a graph for describing a difference in optical characteristic between (i) a case in which a liquid crystal panel is driven in a driving mode A so as to display image data having been subjected to gamma correction based on a gamma correction parameter (correction parameter A) and (ii) a case in which the liquid crystal display panel is driven in a driving mode B so as to display image data having been subjected to gamma correction based on the identical gamma correction parameter.

Next, the following discusses a second embodiment of the present invention with reference to FIGS. 4 through 6. A liquid crystal display device 20 of the present embodiment is different from Embodiment 1 in that a liquid crystal panel 6 of the liquid crystal display device 20 has a polarity inversion driving method that is also switched at the time at which the driving mode A is switched to the driving mode B and that an image optimization circuit 24 transmits to a liquid crystal driver 27 image data that has been subjected to a gamma correction in accordance with the polarity inversion driving method. Other arrangements of the liquid crystal display device 20 are as described in Embodiment 1. For convenience of description, any member of the present embodiment which member is identical in function to a corresponding member illustrated in the drawings referred to for Embodiment 1 above is given an identical reference sign, and description of such members are omitted here.

FIG. 4 is a diagram schematically illustrating a system configuration of the liquid crystal display device 20.

In a case where the liquid crystal driver 27 is driven in the driving mode A, which is the motion image display mode that has already been described for Embodiment 1, the driving frequency reaches as high as 60 Hz, thereby causing electric power consumption to increase. Therefore, as illustrated in FIG. 4, the image optimization circuit 24 included in a host 22 transmits an inversion driving control signal to the liquid crystal driver 27 via a control signal transmission path 10 so as to cause the liquid crystal driver 27 to display an image on the basis of column inversion driving, i.e., a polarity inversion driving method in which electric power consumption is small.

On the other hand, in a case where the liquid crystal driver 27 is driven in the driving mode B, i.e., in the still image display mode, the liquid crystal driver 27 has a driving frequency so low that flickers are likely seen on a screen. Therefore, the image optimization circuit 24 transmits an inversion driving control signal to the liquid crystal driver 27 via the control signal transmission path 10 so as to cause the liquid crystal driver 27 to display an image on the basis of dot inversion driving, i.e., a polarity inversion driving method in which flicker occurrence is low.

FIG. 5 shows diagrams for describing the polarity inversion driving method used in the liquid crystal display device 20.

(a) of FIG. 5 is a diagram illustrating the column inversion driving used in a case where the liquid crystal driver 27 is driven in the driving mode A.

(b) of FIG. 5 is a diagram illustrating the dot inversion driving used when the liquid crystal driver 27 is driven in the driving mode B.

As compared with the driving mode A, the driving mode B is extremely small in electric power consumption because of its driving frequency of as low as 30 Hz or 1 Hz, the polarity inversion driving method can safely be dot inversion driving, which is larger in electric power consumption than column inversion driving.

The above arrangement makes it possible to provide a liquid crystal display device 20 that can display a higher definition image with reduced electric power consumption.

Further, in a case where the image optimization circuit 24 carries out gamma correction with respect to image data in accordance with a switch of the polarity inversion driving method and transmits such image data to the liquid crystal driver 27, the liquid crystal display device 20 can display an even higher definition image.

A liquid crystal display panel, as a characteristic, has display luminance that is not proportional to an input voltage. Thus, image data for a liquid crystal display panel is typically subjected to gamma correction. However, since the polarity inversion driving method is different between the driving modes A and B as described above, there is a difference in optical characteristic of the liquid crystal display panel between the driving modes A and B.

FIG. 6 is a graph for describing a difference in optical characteristic between (i) a case in which the liquid crystal panel 6 is driven in the driving mode A so as to display image data having been subjected to gamma correction based on a gamma correction parameter (correction parameter A) and (ii) a case in which the liquid crystal display panel 6 is driven in the driving mode B so as to display image data having been subjected to gamma correction based on the identical gamma correction parameter.

FIG. 6 shows (i) a solid line to indicate an optical characteristic for the case in which the liquid crystal panel 6 is driven in the driving mode A so as to display image data having been subjected to gamma correction based on the correction parameter A and (ii) a dotted line to indicate an optical characteristic for the case in which the liquid crystal panel 6 is driven in the driving mode B so as to display image data having been subjected to gamma correction based on the correction parameter A.

The image optimization circuit 24 is arranged to, (i) in a case where the liquid crystal panel 6 is driven in the driving mode A, carry out gamma correction with respect to image data on the basis of the correction parameter A and transmit the image data to the liquid crystal driver 27 via the image data transmission path 11 and to, (ii) in a case where the liquid crystal panel 6 is driven in the driving mode B, carry out gamma correction with respect to image data on the basis of a correction parameter B, different from the correction parameter A, and transmit the image data to the liquid crystal driver 27 via the image data transmission path 11.

Note that the correction parameter B, different from the correction parameter A, is not particularly limited, provided that that correction parameter can reduce a difference between gamma curves illustrated in FIG. 6.

The correction parameters A and B can be simply stored in the image optimization circuit 24 as a lookup table.

The above arrangement makes it possible to provide a liquid crystal display device 20 that can display an even higher definition image.

Each embodiment of the present invention uses an oxide semiconductor liquid crystal panel as a liquid crystal display panel and sets the driving frequency of the liquid crystal panel at a low value so as to display an image with reduced electric power consumption. However, the liquid crystal display panel is not limited to such a liquid crystal panel and can be, for example, a liquid crystal panel including a substrate having TFTs each including a semiconductor layer made of CGS, a-Si, or the like.

By controlling the size of image data and the driving frequency for the image data in accordance with a frequency of an image update from a CPU, it is also possible to display a high-resolution image even in a case where the size of the image data transmitted from the CPU exceeds a maximum transmission capacity for one frame period between the image optimization circuit and the liquid crystal driver.

Note that, as a matter of course, respective descriptions below of (i) an image compression method, (ii) an image restoration method, and (iii) the driving frequency apply not only to Embodiment 2 but also to Embodiment 1.

The above description has discussed a data compression method by taking an example case of image processing in which image data of a pixel adjacent to another pixel is removed. However, the image compression method is not limited to it and, as a matter of course, conventional image compression processing can be used. The image restoration method may also vary similarly.

The above description has assumed that the driving frequency is 60 Hz in a case where update information transmitted from the CPU 3 to the image optimization circuit 4 includes an image update and that the driving frequency is 30 Hz and/or 1 Hz in a case where update information transmitted from the CPU 3 to the image optimization circuit 4 does not include an image update. However, as a matter of course, the driving frequencies are not limited to the above values.

The present invention is not limited to the description of the embodiments above, but may be altered by a skilled person in the art within the scope of the claims. Any embodiment derived from a proper combination of technical means disclosed in different embodiments is also encompassed in the technical scope of the present invention.

CONCLUSION

A display device of the present invention is a display device including: a display panel including a plurality of active elements; a driving circuit for driving scanning signal lines and data signal lines both of which are included in the display panel; and an image processing circuit section for supplying image data and a control signal to the driving circuit, the image processing circuit section including: an image optimization circuit for switching, in accordance with an update frequency of the image data, between (i) a first mode in which the driving circuit is driven at a first driving frequency and (ii) a second mode in which the driving circuit is driven at a second driving frequency lower than the first driving frequency, in a case where the driving circuit is driven in the first mode and image data having a data amount that exceeds a maximum transmission capacity for one frame period is inputted, within the one frame period, via a transmission path provided between the image processing circuit section and the driving circuit, the image optimization circuit carrying out first image data processing for reducing the data amount of the image data so that the image data is transmitted via the transmission path within the one frame period while the driving circuit is driven in the first mode, and the driving circuit, in accordance with an image restoration control signal transmitted from the image optimization circuit, carrying out second image processing for restoring, for display, the image data that has been subjected to the first image data processing, in a case where the driving circuit is driven in the second mode, the image optimization circuit transmitting a control signal for causing the driving circuit to be driven at the second driving frequency so that the image data is transmitted via the transmission path within one frame period while the driving circuit is driven in the second driving mode.

According to the above arrangement, it is possible to provide a display device that can be used even in a case where a transmission path for image data is limited and that can optimally display high-resolution image data with reduced electric power consumption.

The display device of the present invention is preferably arranged such that: the driving circuit is driven in the first mode in a case where a motion image is displayed on the display panel; and the driving circuit is driven in the second mode in a case where a still image is displayed on the display panel.

According to the arrangement, it is possible to provide a display device that can optimally display an image data both in a case where the motion image is displayed and in a case where the still image is displayed.

The display device of the present invention is preferably arranged such that the image optimization circuit carries out the first image data processing by removing image data of a first pixel adjacent to a second pixel in the display panel.

According to the above arrangement, it is possible to comparatively easily carry out the first image data processing for reducing the data amount of image data.

The display device of the present invention is preferably arranged such that the driving circuit carries out the second image data processing by using image data of the second pixel as the image data of the first pixel.

According to the above arrangement, it is possible to comparatively easily carry out the second image data processing for enlarging, for display, the image data that has been subjected to the first image data processing.

The display device of the present invention is preferably arranged such that in a case where the driving circuit is switched from the first mode to the second mode, the display device displays, on the display panel a plurality of times, an identical image with use of immediately previously updated image data.

The display device of the present invention is preferably arranged such that in a case where the driving circuit is driven in the first mode or the second mode, the display device displays, on the display panel a plurality of times, an identical image with use of immediately previously updated image data.

According to the above arrangements, it is possible to provide a display device that can prevent an afterimage and that can display a high definition image.

Note that in a case where the display device displays, on the display panel a plurality of times, an identical image with use of immediately previously updated image data while the driving circuit is driven in the first mode, it is possible to eliminate an afterimage more quickly.

The display device of the present invention is preferably arranged such that the second driving frequency of the second mode is set so as to decrease stepwise.

According to the above arrangement, it is possible to provide a display device that can (i) prevent a display image from being disturbed by an abrupt switch of the driving frequency and that can (ii) display a high definition image.

The display device of the present invention is preferably arranged such that in a case where the driving circuit is driven in the first mode, the display panel is driven on the basis of column inversion driving.

According to the arrangement, it is possible to further reduce electric power consumption.

The display device of the present invention is preferably arranged such that in a case where the driving circuit is driven in the second mode, the display panel is driven on the basis of dot inversion driving.

According to the above arrangement, it is possible to provide a display device that can prevent flickers and that can display a higher definition image.

The display device of the present invention is preferably arranged such that the image optimization circuit carries out gamma correction with respect to the image data so as to approximate, to each other, (i) a first gamma curve for a case in which the display panel is driven on the basis of the column inversion driving and (ii) a second gamma curve for a case in which the display panel is driven on the basis of the dot inversion driving.

According to the above arrangement, it is possible to provide a display device that can display even higher definition image.

The display device of the present invention is preferably arranged such that, in a case where the first mode is switched to the second mode, the data amount of the image data increases stepwise.

According to the arrangement, it is possible to prevent display quality from deteriorating due to an abrupt change in data amount of the image data.

The display device of the present invention is preferably arranged such that each of the plurality of active elements includes an oxide semiconductor layer.

The display device of the present invention is preferably arranged such that the oxide semiconductor layer is a semiconductor layer containing at least one element selected from indium, gallium, and zinc.

According to the above arrangement, an oxide semiconductor liquid crystal panel is used. This makes it possible to provide a display device that can optimally display high-resolution image data with reduced electric power consumption.

An electronic device of the present invention includes any one of the above display devices.

According to the above arrangement, it is possible to provide an electronic device that can be used even in a case where a transmission path for image data is limited and that can display high-resolution image data with reduced electric power consumption.

INDUSTRIAL APPLICABILITY

The present invention is suitably applicable to a display device and an electronic device.

REFERENCE SIGNS LIST

1 Liquid Crystal Display Device (Display Device)
2 Host (Image Processing Circuit Section)
3 CPU
4 Image Optimization Circuit
5 Memory
6 Liquid Crystal Panel (Display Panel)
7 Liquid Crystal Driver (Driving Circuit)
8 Liquid Crystal Module Section
8a Liquid Crystal Module Section
9 Memory Bus
10 Control Signal Transmission Path (Transmission Path)
11 Image Data Transmission Path (Transmission Path)
20 Liquid Crystal Display Device (Display Device)
22 Host (Image Process Circuit Section)
24 Image Optimization Circuit
27 Liquid Crystal Driver (Driving Circuit)

The invention claimed is:

1. A display device comprising:
a display panel including a plurality of active elements;
a driving circuit that drives scanning signal lines and data signal lines both of which are included in the display panel and that updates a display of the display panel at a driving frequency; and
an image processing circuit that supplies image data and a control signal to the driving circuit, the image processing circuit including:
an image optimization circuit that switches, in accordance with an update frequency of the image data, between (i) a first mode in which the driving circuit is driven at a first driving frequency and (ii) a second mode in which the driving circuit is driven at a second driving frequency lower than the first driving frequency, wherein
in a case where the driving circuit is driven in the first mode,
the image optimization circuit, in a case where the image data to be transmitted via a transmission path provided between the image processing circuit and the driving circuit has a data amount that exceeds a maximum transmission capacity for one frame period, performs first image data processing that reduces the data amount of the image data so that the image data is transmitted via the transmission path within the one frame period while the driving circuit is driven in the first mode, and
the driving circuit, in accordance with an image restoration control signal transmitted from the image optimization circuit, performs second image data processing that restores, from the data amount of the image data that has been subjected to the first image data processing, the data amount of the image data that has not yet been subjected to the first image data processing to display the image data,
in a case where the driving circuit is driven in the second mode,
the image optimization circuit transmits a control signal that causes the driving circuit to be driven at the second driving frequency so that the image data is transmitted via the transmission path within one frame period while the driving circuit is driven in the second mode.

2. The display device as set forth in claim 1, wherein:
the driving circuit is driven in the first mode in a case where a motion image is displayed on the display panel; and
the driving circuit is driven in the second mode in a case where a still image is displayed on the display panel.

3. The display device as set forth in claim 1, wherein:
the image optimization circuit carries out the first image data processing by removing image data of a first pixel adjacent to a second pixel in the display panel; and
the driving circuit carries out the second image data processing by using image data of the second pixel as the image data of the first pixel.

4. The display device as set forth in claim 1, wherein:
in a case where the driving circuit is switched from the first mode to the second mode, the display device displays, on the display panel a plurality of times, an identical image with use of immediately previously updated image data.

5. The display device as set forth in claim 1, wherein the second driving frequency of the second mode is set so as to decrease stepwise.

6. The display device as set forth in claim 1, wherein, in a case where the driving circuit is driven in the first mode, the display panel is driven on a basis of column inversion driving.

7. The display device as set forth in claim 1, wherein, in a case where the driving circuit is driven in the second mode, the display panel is driven on a basis of dot inversion driving.

8. The display device as set forth in claim 1, wherein:
in a case where the driving circuit is driven in the first mode, the display panel is driven on a basis of column inversion driving;
in a case where the driving circuit is driven in the second mode, the display panel is driven on a basis of dot inversion driving; and
the image optimization circuit carries out gamma correction with respect to the image data so as to approximate, to each other, (i) a first gamma curve for a case in which the display panel is driven on the basis of the column inversion driving and (ii) a second gamma curve for a case in which the display panel is driven on the basis of the dot inversion driving.

9. The display device as set forth in claim 1, wherein, in a case where the first mode is switched to the second mode, the data amount of the image data increases stepwise.

10. The display device as set forth in claim 1, wherein:
each of the plurality of active elements includes an oxide semiconductor layer.

11. The display device as set forth in claim 10, wherein the oxide semiconductor layer is a semiconductor layer containing at least one element selected from indium, gallium, and zinc.

12. An electronic device comprising a display device as set forth in claim 1.

\* \* \* \* \*